United States Patent [19]

Yoneyama et al.

[11] Patent Number: 5,187,810
[45] Date of Patent: Feb. 16, 1993

[54] ROUTE GUIDANCE SYSTEM FOR PROVDING A MOBILE STATION WITH OPTIMUM ROUTE DATA IN RESPONSE TO A GUIDANCE REQUEST TOGETHER WITH BASE STATION DATA INDICATIVE OF AN IDENTIFICATION OF A BASE STATION

[75] Inventors: Hiroto Yoneyama; Atushi Yashiki; Toshiyuki Kodama, all of Tokyo, Japan

[73] Assignee: Oki Electric Industry Co., Ltd., Tokyo, Japan

[21] Appl. No.: 799,753

[22] Filed: Nov. 27, 1991

Related U.S. Application Data

[63] Continuation of Ser. No. 362,768, Jun. 7, 1989, abandoned.

[30] Foreign Application Priority Data

Jun. 10, 1988 [JP] Japan ................... 63-141546
Jun. 10, 1988 [JP] Japan ................... 63-141547
Jun. 10, 1988 [JP] Japan ................... 63-141548
Jun. 10, 1988 [JP] Japan ................... 63-141549

[51] Int. Cl.$^5$ ............ H04Q 7/00; G08G 1/123; G08G 1/09
[52] U.S. Cl. ............... 455/34.1; 455/53.1; 455/54.2; 455/56.1; 340/905; 340/991; 340/993; 340/994
[58] Field of Search ............... 455/53-54, 455/56, 66-67, 34, 53.1, 54.1, 54.2, 34.1, 34.2, 67.1, 89; 340/905, 988-994, 539; 342/457

[56] References Cited

U.S. PATENT DOCUMENTS 4,182,989 1/1981 Endo et al. ............... 455/54
4,311,876 1/1982 Endo et al. ............... 455/54

FOREIGN PATENT DOCUMENTS 0024010 2/1981 European Pat. Off. .

OTHER PUBLICATIONS

P. Brägas, "Leit-und Informationssysteme im Kraftfahrzeug-ein Beitrag zur Verbesserung des Verkehrsablaufs und der Verkehrssicherheit", *Internationales Verkehrswesen*, Sep./Oct. 1985, paragraph 4.
C. Reuber, "Elektronik für Information und Navigation im Auto", *Funk-Technik*, vol. 41, 1986, p. 276-278.

*Primary Examiner*—Reinhard J. Eisenzopf
*Assistant Examiner*—Andrew Faile
*Attorney, Agent, or Firm*—Edward D. Manzo; Mark J. Murphy

[57] ABSTRACT

A mobile telecommunications system includes a plurality of base stations each being communicatable with a mobile station by radio. A telecommunications network accommodates the plurality of base stations for switching communications to the plurality of base stations. A system center is connected to the telecommunications network for selecting an optimum route on the basis of instantaneous traffic conditions. Any of the base stations sends to the mobile station base station data representative of the base station. When the mobile station sends a guidance request for requesting route guidance data, the telecommunications network reports the guidance request to the system center. The system center selects, in response to the guidance request, an optimum route matching instantaneous traffic conditions and transmits optimum route data representative of the optimum route to the mobile station over the telecommunications network.

28 Claims, 9 Drawing Sheets

| ROADSIDE STATION CODE | ROUTE COMMAND DATA |
|---|---|
| C | TURN LEFT AT CROSSROADS X |
| D | TURN RIGHT AT CROSSROADS Y |
| E | TURN LEFT AT CROSSROADS Z |
| | |
| | |

ROUTE GUIDANCE SYSTEM FOR PROVDING A MOBILE STATION WITH OPTIMUM ROUTE DATA IN RESPONSE TO A GUIDANCE REQUEST TOGETHER WITH BASE STATION DATA INDICATIVE OF AN IDENTIFICATION OF A BASE STATION

This is a continuation, of application Ser. No. 07/362,768, filed Jun. 7, 1989 abandoned.

BACKGROUND OF THE INVENTION

1. Field of the Invention

The present invention relates to a mobile telecommunications system and, more particularly, to a route guidance system applicable to a mobile telecommunications system for guiding an automotive vehicle or similar vehicle along a particular route to a destination.

2. Description of the Prior Art

Typical of the route guidance system for a mobile telecommunications system with which the present invention is concerned is a navigation system for automotive vehicles. In an automotive vehicle navigation system, an on-board unit mounted on a vehicle has a CD-ROM or similar optical storing medium which is loaded with stored map data and a CRT or similar display capable of displaying the map data thereon. With this system, it is possible to indicate the instantaneous position of the vehicle on a map being shown on the display. The navigation system is implemented by a transmitter mounted on a roadside sign plate, for example, and a receiver mounted on a vehicle, the transmitter transmitting position data representative of the transmitter to the receiver. Every time the receiver receives position data from such a transmitter, the instantaneous position of the vehicle appearing on the display is updated. During the interval between the reception of position data from one transmitter and the reception of position data from the next transmitter, the position of the on-board unit is updated automatically as determined on the basis of the travelling direction and travelling velocity of the vehicle. The occupant of the vehicle is allowed to recognize the varying position of the vehicle by observing the position in the map being indicated on the display and to thereby determine whether or not the vehicle is following the right way to the destination.

The prior art navigation system stated above has various drawbacks left unsolved, as follows. The occupant has to select an adequate route to the destination by the own discretion, i.e., all that can be seen is whether or not the vehicle is travelling the right way to a destination. The occupant, of course, cannot select an optimum route matching the instantaneous traffic conditions because the occupant determines the route to a destination by mere conjecture. When the instantaneous traffic conditions are changed due to an accident or similar cause, the occupant of the vehicle cannot cope with it immediately and, in the worst case, only particular roads will congest with a number of vehicles. Further, each vehicle has to be furnished with map data. It is extremely difficult to furnish a vehicle with minute map data which cover all the possible areas of interest due to, among others, the limited capacity of the previously mentioned storing medium. This practically inhibits the occupant from selecting an adequate route, depending on the destination. Map data in itself is sequentially updated with time and is sometimes temporarily changed in association with the unusual occurrences such as traffic accidents and road constructions. Hence, even if such variable data are prepared beforehand, it is almost impracticable to deal with the change or the addition of data rapidly.

SUMMARY OF THE INVENTION

It is therefore an object of the present invention to provide a route guidance system for a mobile telecommunications system which guides a vehicle to any desired destination along an optimum route in association with the varying traffic conditions.

In one aspect of the present invention, there is provided a mobile telecommunications system comprising a plurality of base stations each being communicable with a mobile station by radio, a telecommunications network accommodating the plurality of base stations for switching communications to the base stations, and a system center connected to the telecommunications network for selecting an optimum route on the basis of instantaneous traffic conditions. Any of the base stations transmits to the mobile station base station data representative of the base station. When the mobile station sends a guidance request for requesting route guidance data, the telecommunications network reports the guidance request to the system center. The system center selects, in response to the guidance request, an optimum route matching instantaneous traffic conditions and transmits optimum route data representative of the optimum route to the mobile station over the telecommunications network.

In another aspect of the present invention, there is provided a mobile telecommunications system comprising a plurality of base stations each being communicatable with a mobile station by radio, a telecommunications network accommodating the plurality of base stations for switching communications to the plurality of base stations, and a system center connected to the telecommunications network for producing an optimum route matching instantaneous traffic conditions and route command data indicative of the optimum route, on the basis of instantaneous traffic conditions. Any of the base stations transmits base station data representative of the base station to the mobile station. When the mobile station transmits a guidance request requesting route guidance data, the telecommunications network reports the guidance request to the system center. On receiving the guidance request, the system center selects an optimum route matching instantaneous traffic conditions and transmits optimum route data including the route command data to the mobile station.

In a further aspect of the present invention, there is provided a mobile station for a mobile telecommunications system, comprising receiving means for receiving base station data representative of a base station which the mobile station is passing from the base station by radio, and receiving by radio and via the base station route data produced by a system center which selects an optimum route for the mobile station as needed, transmitting means for transmitting by radio transmit data which is produced by the mobile station to the base station, outputting means for performing route guidance visually and/or auditorily on receiving the route data from the system center and the base station data from the base station, and inputting means for producing transmit data including a guidance request for requesting route guidance. The mobile station is allowed to use electromagnetic waves of a single frequency in transmitting and receiving data from the base station.

In accordance with the present invention, when a mobile station sends a guidance request for requesting route guidance data, the request is reported to a system center via a telecommunications network. On receiving the request, the system center selects an optimum route for a mobile station to follow in consideration of the instantaneous traffic conditions and transmits the optimum route in the form of optimum route data to the mobile station of concern over the telecommunications network. The mobile station, having received the optimum route data, guides the vehicle along the optimum route on the basis of the route data and base station data which are transmitted from base stations. When the mobile station determines when the mobile station has been brought out of the expected route, it retransmits the guidance request to the system center.

When the system center, following the transmission of the optimum route data to the mobile station, recognizes that the optimum route data being held should be changed due to a change in the traffic conditions, it changes the optimum route data and holds the resulting new data while transmitting the new data to the mobile station of concern.

Further, in accordance with the present invention, the system center, upon reception of the guidance request from the mobile station, selects an optimum route for the mobile station to follow and produces route command data associated with the optimum route. The optimum route and route command data are sent to the mobile station of concern in the form of optimum route data. On receiving base station data from a base station associated with the optimum route data, the mobile station outputs a route command associated with the base station for thereby guiding the vehicle along the optimum route.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
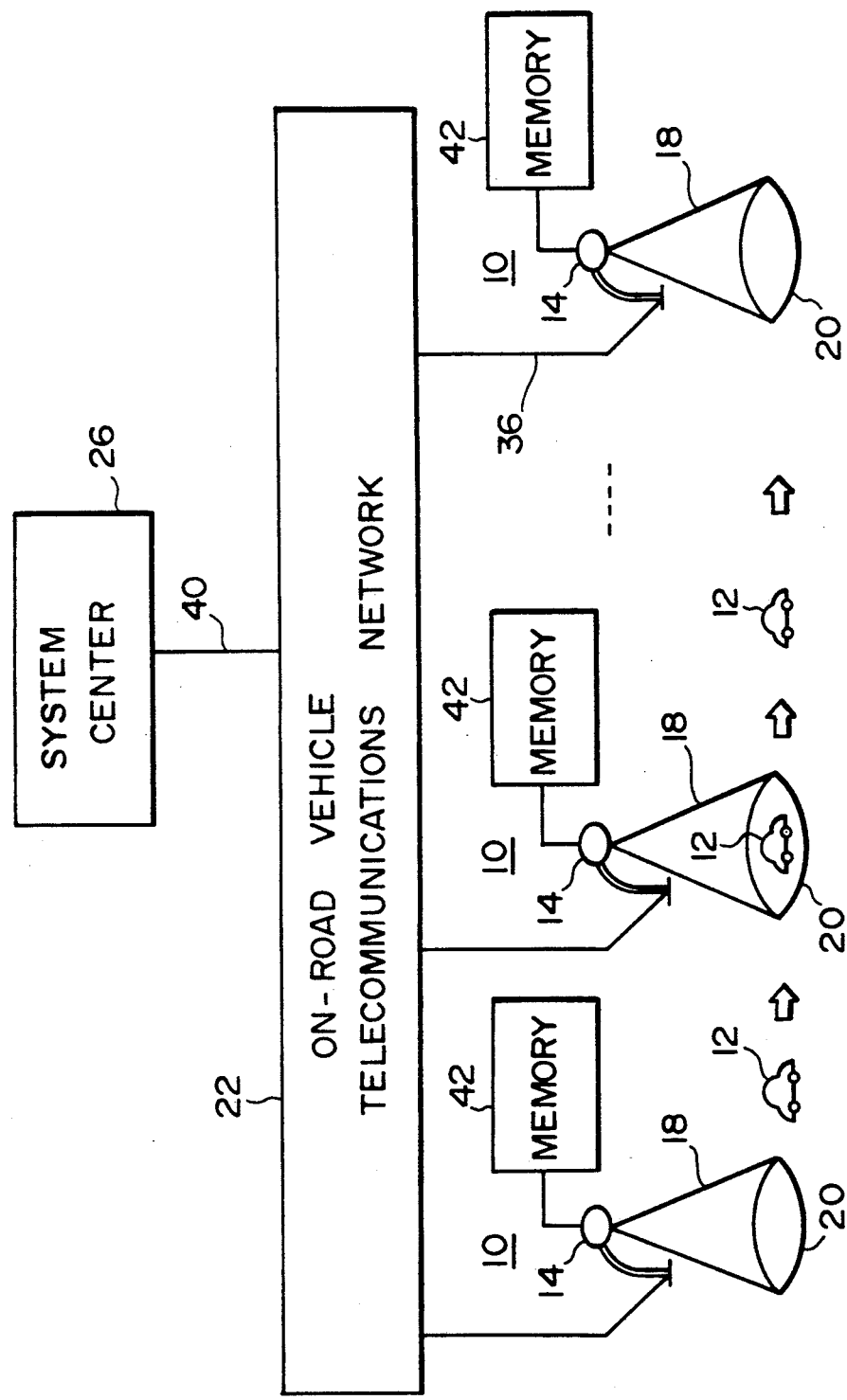
FIG. 1 is a schematic block diagram of a mobile telecommunications system embodying the present invention which is applied to road traffic and implemented as an on-road vehicle telecommunications system by way of example.

Referring to FIG. 1 of the drawings, a mobile telecommunications system embodying the present invention is shown and implemented as an on-road vehicle telecommunications system applicable to land traffic, especially road traffic which involves automobiles and other similar vehicles. To this mobile telecommunications system, the technology disclosed in the co-pending patent application Ser. No. 07/357,010, now U.S. Pat. No. 5,058,201 entitled "Mobile Telecommunications System Using Distributed Miniature Zones" and assigned to the same assignee as the present application is advantageously applicable. As shown, a plurality of roadside stations 10 are located along a road such as an ordinary road or a thruway at the intervals of several hundred meters or several kilometers, for example. The distance between nearby roadside stations 10 may be suitably selected in matching relation to the regulation speed of the road, for example. Each roadside station 10 is a land station which serves as a base station capable of communicating with a subscriber vehicle 12 over a radio channel.

Each roadside station 10 covers a limited service area or zone 20 and has a transmitter/receiver 14 for transmitting and receiving an electromagnetic wave 18 from an on-board unit, or mobile station, 16 (FIG. 2) which is mounted on a subscriber vehicle 12 that is present in the zone 20. A characteristic feature of the illustrative embodiment is that the roadside stations 10 are distributed at intervals and each zone 20 is far smaller than the interval between nearby roadside stations 10. The diameter of each zone 20 may be of the order of several ten meters to a hundred meters, for example. Therefore, the nearby zones 20 leave therebetween an area in which the mobile station 16 is substantially not responsive to any of the electromagnetic waves 18 issuing from the roadside stations 10, i.e. a no-wave area. A vehicle 12 can communicate with any of the roadside stations 10 only when it is operated within the zone 20 defined by the roadside station 10.

Having the above configuration, the illustrative embodiment allows the nearby roadside stations 10 to use the same frequency repetitively and effectively. Basically, therefore, the radio links between the roadside stations 10 and the mobile stations 16 included in the entire system can be implemented by a single frequency. A system with which full-duplex communication is available uses a pair of frequencies, one for an up-going channel and the other for a down-going channel. This eliminates the need for the switchover of frequency which is indispensable with the prior art cellular system. Having these characteristic features, the system will be referred to as a distributed miniature zone system while each zone 20 will be referred to as a miniature zone. It is noteworthy that the radio communication between the roadside stations 10 and the mobile stations 16 is hardly susceptible to fading because it is the propagation of an electromagnetic wave which occurs within an extremely short period of time. The communication, therefore, can be effected at a high speed such as 256 kilobits per second to 1.5 megabits per second. In the illustrative embodiment, it is especially preferable that a communication rate of 512 kilobits per second or so be selected to promote cost-effective system configuration.

The roadside stations 10 form a part of an on-road vehicle telecommunications network 22 and, in this particular embodiment, they are capable of accessing an on-road vehicle telecommunications system center 26 and other similar communication facilities. Adopting a hierarchical configuration as shown in FIG. 2 by way of example, the on-road vehicle telecommunications network 22 performs switching between the system center 26 and the mobile stations 16.

The distributed miniature zone communication system described above promotes high-speed communication between the mobile stations 16 and the roadside stations 10 and, therefore, implements a variety of route guidance services including high-speed data communications. Typical examples are a navigation service for guiding an automobile or similar subscriber vehicle 12 along an adequate route which may depend on the degree of traffic congestion and weather, and a data communication service for allowing the mobile stations 16 to communicate with the system center 26 via the on-road vehicle telecommunications network 22 so that the operations of a great number of vehicles 12 may be managed efficiently, as in the illustrative embodiment.

Figure 2:
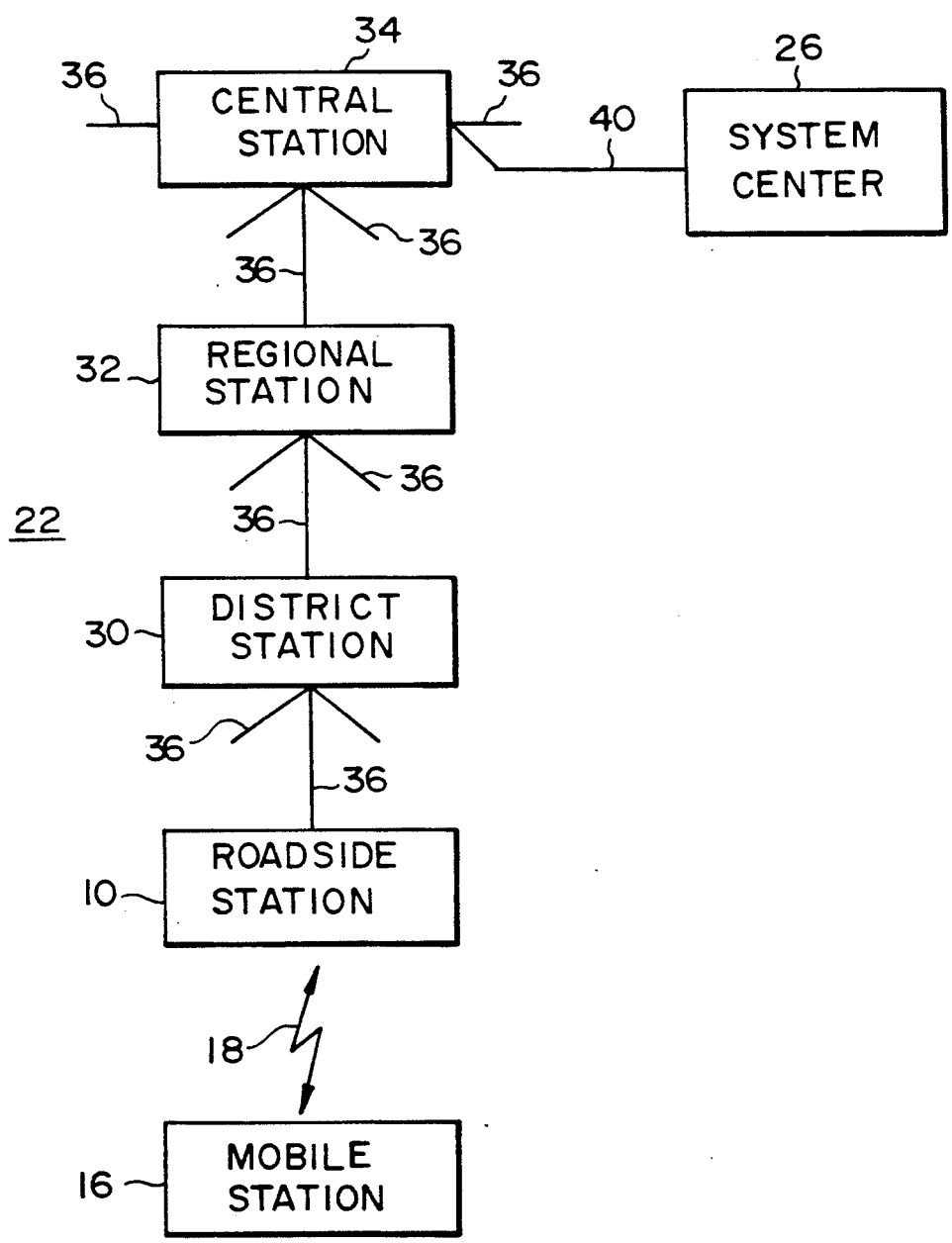
FIG. 2 is a schematic block diagram representative of a specific hierarchical configuration of the on-road vehicle telecommunications system shown in FIG. 1.

Referring the FIG. 2, the hierarchy of the on-road vehicle telecommunications network 22 is constituted by district stations or offices 30 each accommodating a plurality of roadside stations 10 which are distributed in a certain district, regional stations or offices 32 each accommodating a plurality of district stations 30 over a certain area, and central stations 34 each accommodating a plurality of regional stations 32. The associated stations 30, 32 and 34 inclusive of the roadside stations 10 will be collectively called a land station hereinafter. In the illustrative embodiment, the channels between the associated district station 30, regional station 32 and central station 34 are configured in a tree-like network which is constituted by basic trunks, tranversal trunks or similar trunks 36. On the other hand, the central stations 34 are interconnected by a mesh type network. The present invention, of course, is not limited to such a network configuration and may be practiced with any other kind of hierarchy which matches with the nature of a road, e.g., an ordinary road or a thruway or a linear network.

The system center 26 plays the role of a data processing system assigned to the navigation of the subscriber vehicles 12, for example. More specifically, the system center 26 receives road information as well as other traffic information from the on-road vehicle telecommunications network 22 and external information centers (not shown) so as to estimate future traffic conditions. When any of the mobile stations 16 requests the system center 26 to send a guidance code which indicates a route to the destination, the system center 26 selects an optimum route on the basis of the estimated traffic conditions, produces a guidance code, and sends it to the mobile station 16 of interest. In this particular embodiment, the guidance code is representative of station codes assigned to those roadside stations 10 which are located along the route to the destination of the mobile station 16. Each mobile station 16 has a storage 212 (FIG. 5) in which the guidance code may be written in the form of a guidance list (FIG. 7), as described later in detail. The system center 26 is accommodated in the central stations 34 by trunks 40. The system center 26 may of course be connected to the regional centers 32 or the district centers 30.

Figure 3:
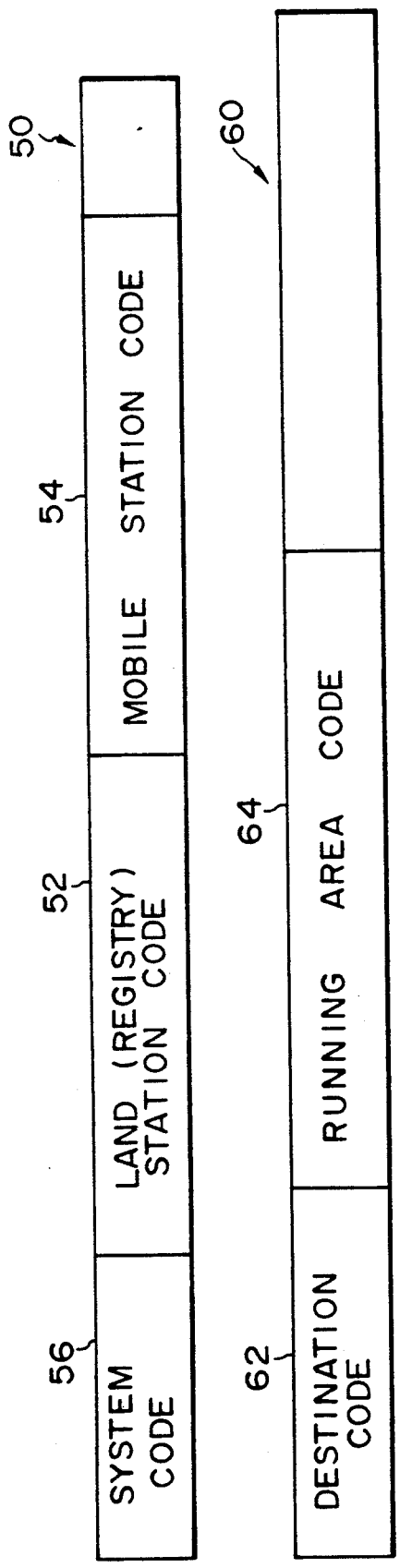
FIG. 3 shows a specific format of a vehicle-oriented code applicable to the system of FIG. 1.

As shown in FIG. 3, in the illustrative embodiment, a vehicle-oriented code for specifying a mobile station 16 is made up of a static code 50 and a dynamic code 60. Apart from the function of providing a mobile station 16 with an identification number within the system, the static code 50 is closely related to the number system of calls which the mobile station 16 may receive from the on-road vehicle telecommunications system center 26. The static code 50 includes a mobile station code 54 for specifying a mobile station 16, a registry land station code 52 representative of a land station where a mobile station 16 is registered, and a system code 56 for identifying the system in distinction from the other systems.

The dynamic code 60 is associated with the moving state of the subscriber vehicle 12 and effectively used to grasp the current condition of the vehicle 12 for a navigating purpose. In this sense, the dynamic code 60 is a code unique to a subscriber vehicle 12 and associated with the district or region in which the vehicle 12 is operated as well as its travelling condition. The dynamic code 60, therefore, plays an important role in allowing the system center 26 to locate a vehicle 12 for a paging purpose and supplying a vehicle 12 with guide information for routing it to a destination. In the illustrative embodiment, the dynamic code 60 includes a destination code 62 representative of a destination of the subscriber vehicle 12 and a running area code 64 representative of an area in which the vehicle 12 is running. In the specific embodiment, when a link number code representative of a particular destination is set in the destination code 62 by way of example, the code 62 is sent to the system center 28 in the form of a guidance request.

As FIG. 1 schematically indicates, each roadside station 10 has a memory 42 which includes an area for storing static information associated with the station 10 such as its own location and bearings and information associated with neighboring roadside stations 10. The roadside station 10 sends such information to all of the subscriber vehicles 12 which move past the station 10. In the illustrative embodiment, the static information may be sent in the form of a message such as "Crossroads X is located 300 meters ahead. Roadside stations A, B, and C are situated respectively on the roads extending straight, to the left and to the right from the crossroads".

Figure 5:
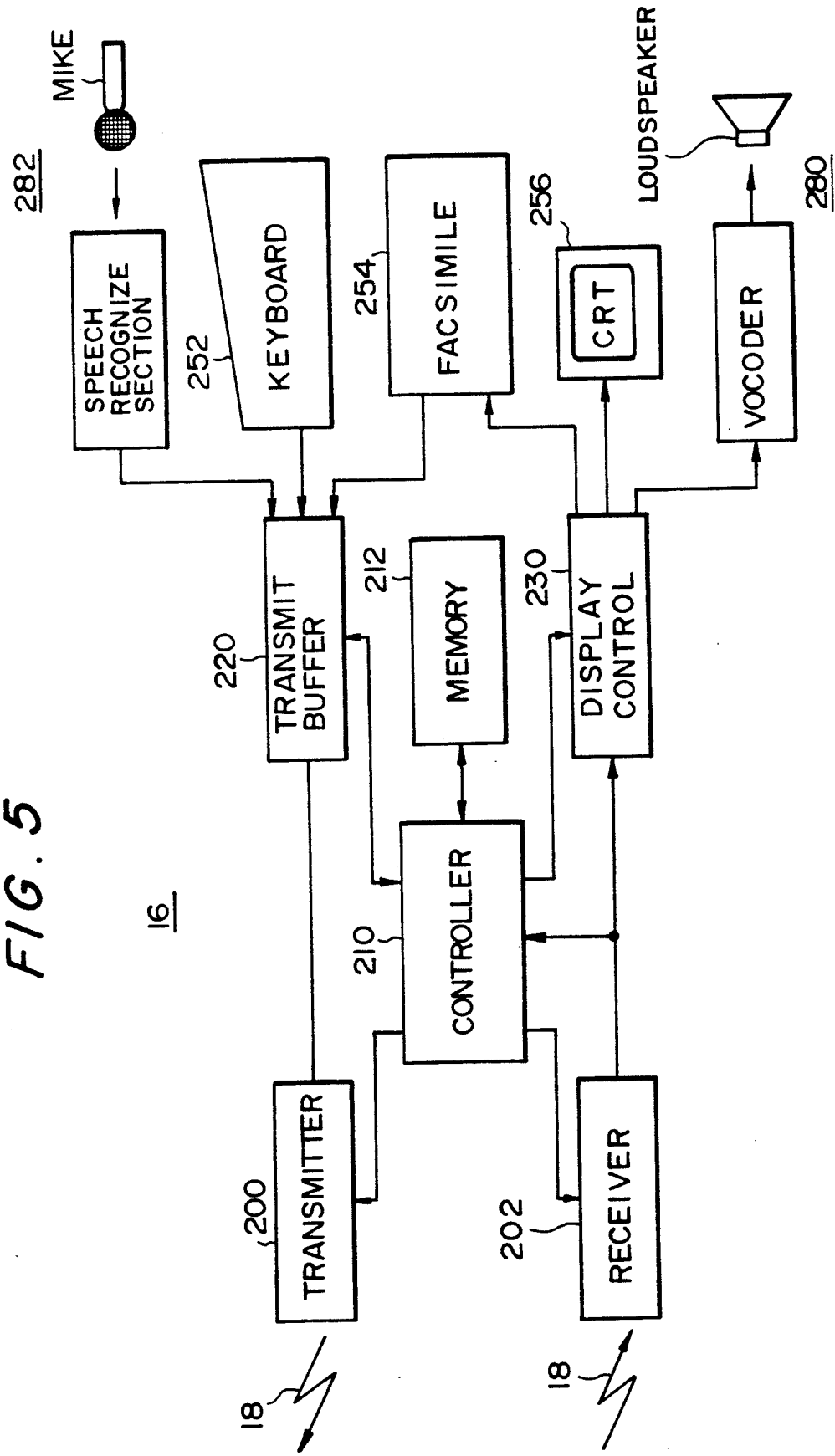
FIG. 5 is a schematic block diagram showing a specific construction of a mobile station or on-board unit included in the system of FIG. 1.

In the illustrative embodiment, the mobile station 16 is mounted on an automobile or similar subscriber vehicle 12 and transmits/receives navigation information, operation supervisory information and other similar data, messages and video signals with the roadside stations 10 while allowing an occupant to see such signals visually and/or auditorily. FIG. 5 shows a specific construction of the mobile station 16 in a block diagram. As shown, the mobile station 16 includes a key input unit or keyboard 252 for entering the destination code 62, guidance request and so forth, and a video display implemented by a cathode ray tube (CRT) 256, a vocoder 280, a speech recognizing unit 282 and a facsimile transceiver 254 which individually interface the roadside station 10 to the vehicle occupant.

A controller 210 collectively governs the operations of the various components of the mobile station 16. Specifically, the controller 210 controls a transmitter 200 and a receiver 202 which interchange electromagnetic waves 18 with the roadside station 10, a display control 230 associated with the vocoder 280, CRT 256 and facsimile transceiver 254, a transmission buffer 220 for temporarily storing an output of the key input unit 252, facsimile transceiver 254 and speech recognizing unit 252, etc. The controller 210 is interconnected to the previously mentioned memory 212 in which a guidance code received from the on-road vehicle telecommunications system center 26 may be written in the form of a guidance list.

The controller 210 of the mobile station 16 which has stored such a guidance list confirms and selects an adequate route for the mobile station 16 to travel on the basis of the static information sent from the latter to the former, and then it informs the vehicle occupant of the route to follow via the CRT 256 and/or the vocoder 280. This allows the vehicle occupant to know the route along which the vehicle 12 is to be guided beforehand, so that it is not necessary to show a map indicative of the route on the display 256. Of course, latest map information is available from the system center 26 whenever needed. The received map information may be indicated on the display 256 or outputted by the facsimile transceiver 254 as the case may be.

The mobile station 16 has a random number table function so that the road station 10 may select an idle channel out of a plurality of channels assigned to the link 18 between the stations 10 and 16 by polling. The mobile station 16 is communicable with the roadside station 10 over the selected idle channel.

Figure 4:
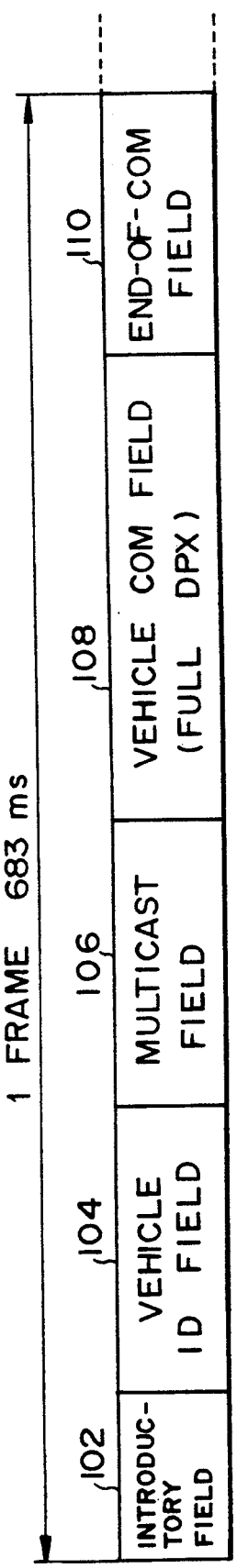
FIG. 4 indicates a specific frame format also applicable to the system of FIG. 1.

In this embodiment, a communication between the on-board mobile station 16 and the base station 10 is effected by polling which uses a frame 100 having a format which is shown in FIG. 4. In the illustrative embodiment, the frame 100 has a period of 683 milliseconds (ms), and a plurality of channels are multiplexed in a great number of time slots of the frame 100. In principle, a necessary two-way communication is completed within one frame period. The radio links 18 are implemented by a single frequency. In the case of full-duplex communication, each of an up-going and a down-going channel is implemented by a different frequency. Nevertheless, since such frequencies are fixed, a subscriber vehicle 12 will be served by the same frequencies throughout the distributed zones 20 of the roadside stations 10. While a communication in principle is completed within one frame period, it may be implemented by a plurality of frames when, for example, the amount of information is extraordinary large such as with a picture or when the radio communication conditions are poor.

As shown in FIG. 4, the frame 100 is headed by an introductory field 102 which includes a preamble, a synchronizing signal, a polling identification (ID) signal, and a code assigned to a roadside station 10. The roadside station 10 polls the mobile station 16 being operated in its own zone 20 at a predetermined period by using the introductory field 102 of the frame 100. The mobile station 16 is held in a receive mode while in an idle state and is brought into a transmit mode when the introductory field 102 is fully received.

The introductory field 102 is followed by a subscriber ID field 104 which allows the mobile station 16 to send its own vehicle codes 50 and 60 while allowing the roadside station 10 to recognize it. Advantageously, two blocks may be sent repetitively so as to achieve a far higher subscriber recognition rate. In response to the polling, the mobile station 16 selects an idle channel by using the random number table. The static subscriber code 50 and dynamic vehicle-oriented code 60 are transmitted to the roadside station 10 over the idle channel. The roadside station 10 registers the mobile station 16 of interest only if the codes 50 and 60 are correctly received over the idle channel without any conflict.

In the illustrative embodiment, the subscriber ID field 104 is followed by a multicast communication field 106. By using the multicast communication field 106, the roadside station 10 sends to the mobile station 16 traffic information and other beacon type dynamic navigation information as well as registration response signal (ACK or NACK). If necessary, the roadside station 10 sends to the mobile station 16 registered by using the vehicle ID field 104 channel information to be used by a vehicle communication field 108, which will be described, together with a signal ACK.

The vehicle communication field 108 is provided next to the simulcast field 106 of the frame 100. In the illustrative embodiment, a full-duplex communication is held between the roadside station 10 and the mobile station 16 by using the vehicle communication field 108. For the full-duplex communication, an up-going and a down-going channel each having a different frequency and selected by the roadside station 10 are used. However, the subscriber vehicle 12 is served by the same frequencies in the zones 20 which are defined by the nearby roadside stations 10. The full-duplex communication, of course, may be replaced with half-duplex or one-way communication. During the vehicle communication field 106, the mobile station 16 and the system center26 interchange a guidance code representative of navigation information, operation supervisory information, message, and video image signal. Such information is imparted to the vehicle occupant in the form of a picture or a speech.

Figure 6:
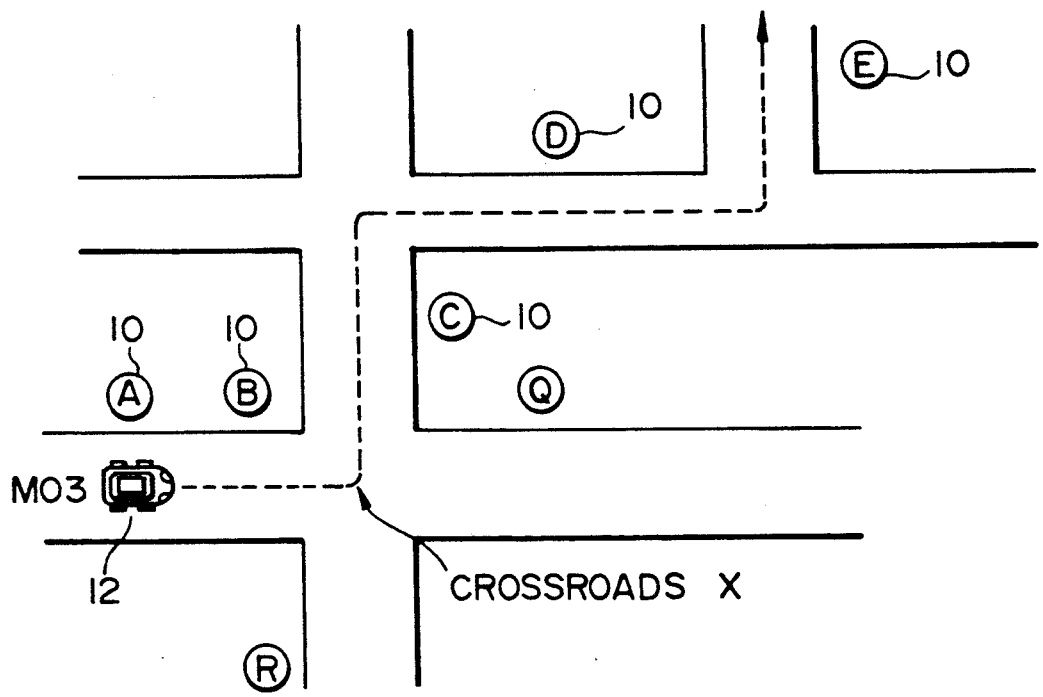
FIG. 6 is a sketch of a route which a subscriber vehicle included in the system of FIG. 1 may follow toward a destination.

FIG. 6 is a sketch of a specific route which a subscriber vehicle 12 sent a guidance request to the system center 26 may follow, and which is useful for understanding the approach of the illustrative embodiment. Assume that the subscriber vehicle 12 shown in FIG. 6 is loaded with a mobile station or on-board unit to which a mobile station code M03 is assigned. To send a guidance request to the system center 26, the occupant of the vehicle 12 manipulates the key input unit 252 to enter a destination which may be a link number code assigned to a particular roadside station 10 by way of example, as in the previous embodiment. Assuming that the occupant enters a link number code assigned to the roadside station E as a destination, the entered code is stored in the transmission buffer 220 of the on-board unit M03 in the form of the destination code 62 of the dynamic code 60.

The controller 210 transmits the destination code 62 to a roadside station 10 which the mobile station M03 reaches for the first time after the entry of the code 62. Specifically, as the mobile station M03 enters the service area 20 of a roadside station A for the first time, the controller 210 of the on-board unit M03 sends the dynamic code 62 including the destination code 62 to the roadside station A by using the vehicle ID field 104 of the frame 100. On receiving the dynamic code 60 from the mobile station M03, the roadside station A once stores it in the memory 42 and then transmits it to the on-road vehicle telecommunications network 22 together with the other codes of the mobile station M03. These codes are switched by the telecommunications network 22, so that a code representative of a guidance request is transmitted to the system center 26.

The system center 26 received the destination of the mobile station M03 selects an optimum route to the roadside station or destination E by taking account of the current traffic conditions also. Further, the system center 26 estimates the further movement of the mobile station M03 and thereby determines a roadside station B which can send a guidance code to the mobile station M03. Then, the system center 26 sends to the telecommunications network 22 a guidance code associated with a roadside station C which immediately follows the roadside station B to a roadside station or destination E. On receiving the guidance code meant for the mobile station M03, the roadside station B stores it in the memory 42 and monitors its own zone 20 in which the mobile station M03 is expected to enter.

Figure 7:
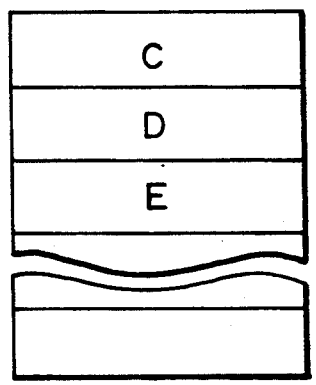
FIG. 7 exemplarily shows a guidance list associated with the route illustrated in FIG. 6.

When the roadside station B finds the mobile station M03 in its zone 20, it sends the guidance code destined to the station M03 by using the vehicle communication field 108 of the frame 100. As the mobile station M03 receives the guidance code, the controller 210 of the station M03 stores it in the memory 212 in the form of a guidance list as shown in FIG. 7. At the same time, the mobile station M03 receives from the roadside station B information which shows the surroundings of the station B, e.g., a message "Crossroads X is located 300 meters ahead. A straight run across the crossroads X will bring you to a roadside station Q, and a right and a left turn will bring you to roadside stations R and C, respectively".

By comparing the roadside station data with the guidance list, the controller 210 of the on-board unit M03 shows the vehicle occupant a direction for driving the vehicle 12. In this instance, since the roadside station C is recorded in the guidance list, the on-board unit M03 instructs the occupant to make a left turn at the crossroads X which is situated 300 meters ahead. For this instruction, the vocoder 280 may produce an audible message such as "Turn left at crossroads X which is located 300 meters ahead" or, alternatively, the display 256 may provide a simple visible direction command thereon.

As the mobile station M03 turns to the left at the crossroads X to enter the zone 20 of the roadside station C, the roadside station C sends static information including its own position information and roadside station information to the mobile station M03 by using the introductory field 102 of the frame 100. In response, the controller 210 of the on-board unit M03 compares the position data of the roadside station C with the guidance list to see that the vehicle 12 is following the right way. Again, the on-board unit M03 shows the occupant the next path to follow in response to the roadside station information which is also fed from the roadside station C. In this manner, the mobile station M03 is guided to the roadside station or destination E by way of the roadside station D.

As described above, in the illustrative embodiment, a subscriber vehicle 12 is capable of reaching a destination by way of an optimum route which matches the instantaneous traffic conditions. Since a travelling direction is instructed by an on-board unit 16 of a subscriber vehicle 12, an occupant needs only to steer the vehicle 12 as instructed by the on-board unit 16 and does not have to select a route on a map being displayed, i.e., map information is not necessary. Further, since the optimum route is prepared by the system center 26, the traffic conditions can be grasped and controlled collectively to thereby promote distributed flows of traffic.

An alternative approach available with the mobile telecommunications system of the present invention will be described. In this alternative embodiment, the controller 210 of each mobile station 16 has a capability of recognizing that the station 16 has been brought out of a correct route selected by the system center 26. Specifically, when a mobile station 16 is off a correct route, the controller 210 of the mobile station 16 sees such a condition on the basis of static data received from a roadside station 10 and guidance list data received from the system center 26 in the form of a guidance code. Then, the controller 210 retransmits a guidance request to the system center 26, requesting the latter to send a guidance code.

Figure 8:
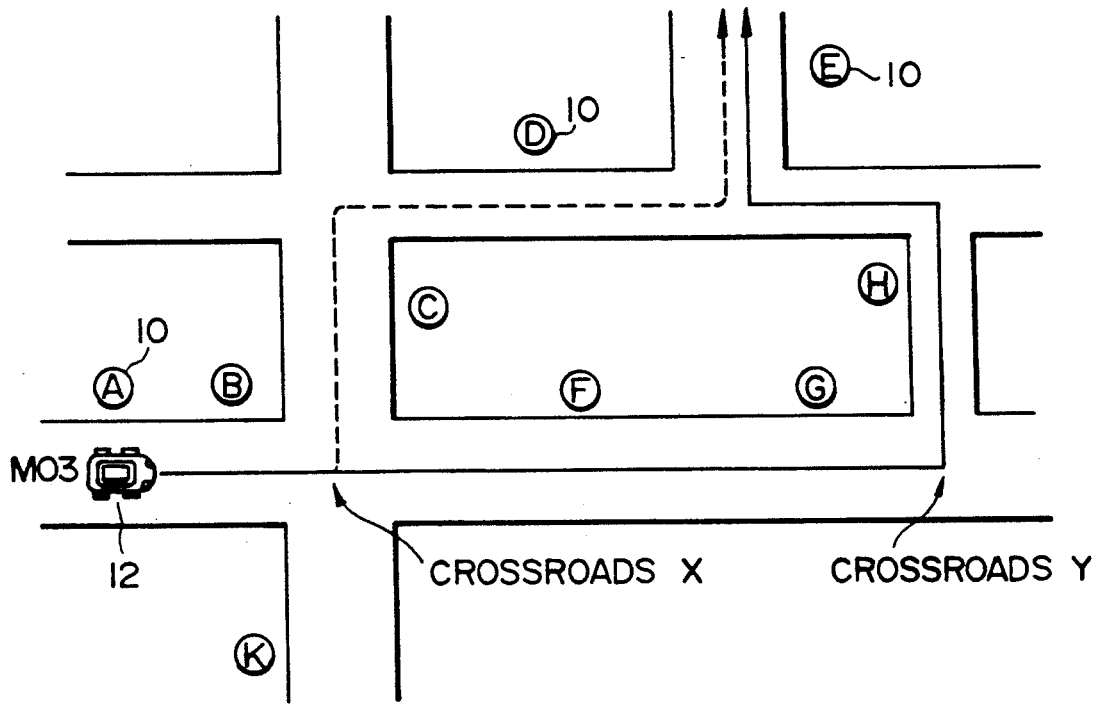
FIG. 8 is a sketch showing a specific route which a subscriber vehicle may follow in accordance with an alternative embodiment of the present invention.

FIG. 8 is a sketch of a specific route which a subscriber vehicle 12 sent a guidance request to the system center 26 may follow, and which is useful for understanding the approach of the illustrative embodiment. Assume that the subscriber vehicle 12 shown in FIG. 8 is loaded with a mobile station or on-board unit to which a mobile station code M03 is assigned. To send a guidance request to the system center 26, the occupant of the vehicle 12 manipulates the key input unit 252 to enter a destination which may be a link number code assigned to a particular roadside station 10 by way of example, as in the previous embodiment. Assuming that the occupant enters a link number code assigned to the roadside station E as a destination, the entered code is stored in the transmission buffer 220 of the on-board unit M03 in the form of the destination code 62 of the dynamic code 60.

The controller 210 transmits the destination code 62 to a roadside station 10 which the mobile station M03 reaches for the first time after the entry of the code 62. Specifically, as the mobile station M03 enters the service area 20 of a roadside station A for the first time, the controller 210 of the on-board unit M03 sends the dynamic code 62 including the destination code 62 to the roadside station A by using the vehicle ID field 104 of the frame 100. On receiving the dynamic code 60 from the mobile station M03, the roadside station A once stores it in the memory 42 and then transmits it to the telecommunications network 22 together with the other codes of the mobile station M03. These codes are switched by the telecommunications network 22, so that a code representative of a guidance request is transmitted to the system center 26.

The system center 26 received the destination code of the mobile station M03 selects an optimum route to the roadside station or destination E by taking account of the current traffic conditions also. Further, the system center 26 estimates the further movement of the mobile station M03 and thereby determines a roadside station B which can send a guidance code to the mobile station M03. In the case that the route indicated by a dotted line in FIG. 8 is the instructed optimum route, the system center 26 sends to the telecommunications network 22 a guidance code associated with a roadside station C which immediately follows the roadside station B to the roadside station or destination E. On receiving the guidance code meant for the mobile station M03, the roadside station B stores it in the memory 42 and monitors its own zone 20 in which the mobile station M03 is expected to enter.

Figure 9:
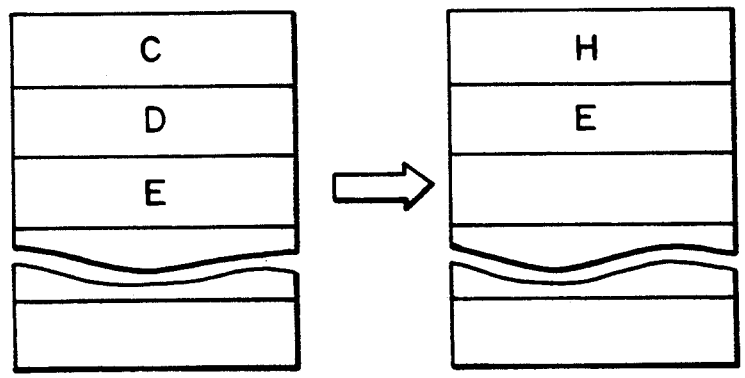
FIG. 9 exemplarily shows a guidance list data stored in which are changed in response to a change of the route.

When the roadside station B finds the mobile station M03 in its zone 20, it sends the guidance code destined to the station M03 by using the vehicle communication field 108 of the frame 100. As the mobile station M03 receives the guidance code, the controller 210 of the station M03 stores it in the memory 212 in the form of a guidance list as shown on the left-hand side of FIG. 9. At the same time, the mobile station M03 receives from the roadside station B information which shows the surroundings of the station B, e.g., a message "Crossroads X is located 300 meters ahead. A straight run across the crossroads X will bring you to a roadside station F, and a right and a left turn at the crossroads X will bring you to roadside stations K and C, respectively".

By comparing the roadside station information with the guidance list, the controller 210 of the on-board unit M03 shows the vehicle occupant a direction for driving the vehicle 12. In this case, the on-board unit M03 instructs the occupant to make a left turn at the crossroads X which is situated 300 meters ahead, because the roadside station C is recorded in the guidance list. For this instruction, the vocoder 280 may produce an audible message such as "Turn left at crossroads X which is located 300 meters ahead" or, alternatively, the display 256 may provide a simple visible direction command thereon.

Assume that the subscriber vehicle 12 has been driven straight ahead across the crossroads X by mistake, as indicated by a solid line in the figure. Then, the mobile station M03 enters the zone 20 of the roadside station F and therefore receives static data associated with the station F during the introductory field 102 of the frame 100. By comparing position information included in the station F static data and the guidance list, the controller 210 of the on-board unit M03 determines, in the illustrative embodiment that the vehicle 12 is off the correct route. Then, the controller 210 retransmits a guidance request to the system center 26 while the on-board unit 16 lies in the zone 20 of the roadside station F. On receiving the guidance request, the system center 26 selects a new optimum route for the vehicle 12 and transmits it to the mobile unit M03 in the form of a guidance code. This guidance code is sent to the mobile station M03 when the latter passes a roadside station G, updating the memory 212 as shown on the right-hand side of FIG. 9.

Further, in response to surroundings information also sent from the roadside station G, the mobile station M03 instructs the occupant to make a left turn at crossroads Y, for example. As soon as the vehicle 12 makes a left turn at the crossroads Y to cause the on-board unit M03 to enter the zone 20 of the roadside station E, the roadside station E sends a static code representative of its position to the mobile station M03 by using the introductory field 102 of the frame 100. In response, the controller 210 compares the position data and the guidance list to see that the vehicle 12 is on the correct route. Further, the controller 210 informs the occupant of the subsequent path to follow, based on the surroundings data. In this manner, the mobile station M03 successfully reaches the destination or roadside station E by way of a roadside station H.

As stated above, in this particular embodiment, a mobile station 16 determined that its associated vehicle 12 is off a correct route retransmits a guidance request to the system center 26. This frees the system center 26 from the need for monitoring the running condition of the mobile station 16 and thereby reduces the load on the system center 26, while allowing the vehicle 12 to arrive at a destination via an optimum route which best matches the instantaneous traffic conditions. In addition, the illustrative embodiment promotes scattered flows of traffic because it is capable of grasping and controlling the traffic collectively.

An alternative route guidance approach which is also available with the mobile telecommunications system of the present invention will be described. In this particular embodiment, the system center 26 produces a guidance code and then stores it together with a mobile station code (FIG. 3) which is particular to a mobile station 16.

In this embodiment, when the system center 26 recognizes a change in the traffic conditions due to an accident, for example, it references the guidance code to search for a mobile station 16 which is related to the change. In the illustrative embodiment, the mobile station 16 is registered in any of the regional stations 32. Hence, the system center 26 searched for a mobile station 16 of interest confirms the location of that mobile station 16 through the regional or registry station 32. The system center 26 determines whether or not to produce a new guidance code on the basis of the current location of the mobile station 16 and, when produced such a code, sends it to the mobile station 16. Then, the memory 212 of the mobile station 16 is updated by the new guidance code, i.e., it stores a new guidance list.

Figure 10:
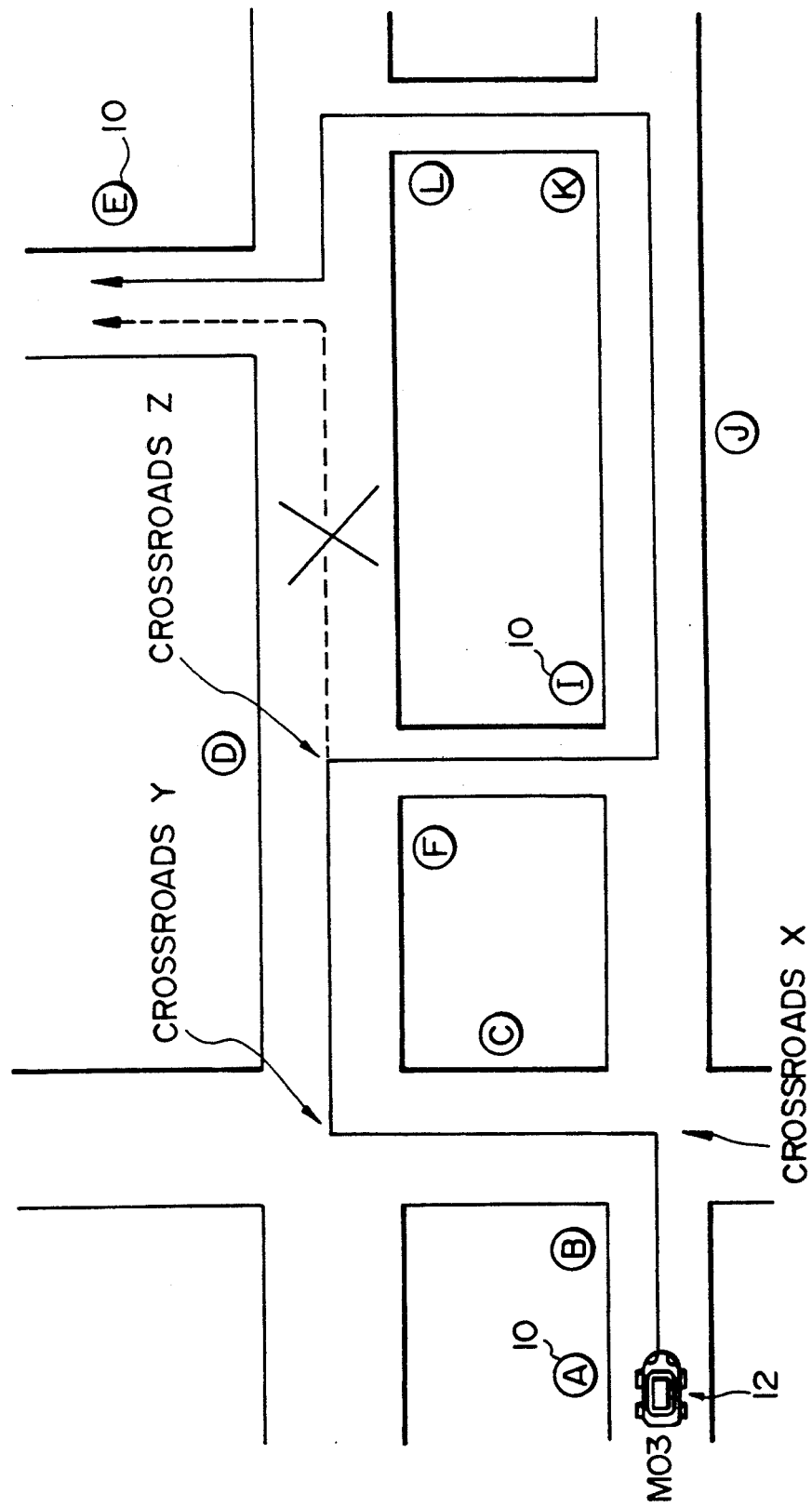
FIG. 10 is a sketch showing a specific route of a subscriber vehicle which is selected in response to a change of a guidance code in accordance with an alternative embodiment of the present invention.

Referring to FIG. 10, there is shown a scketch of a specific route which a subscriber vehicle 12 sent a guidance request to the system center 26 may follow, and which is useful for understanding the approach of the illustrative embodiment. Assume that the subscriber vehicle 12 shown in FIG. 10 is loaded with a mobile station or on-board unit to which a mobile station code M03 is assigned. To send a guidance request to the system center 26, the occupant of the vehicle 12 manipulates the key input unit 252 to enter a destination which may be a link number code assigned to a particular roadside station 10 by way of example, as in the previous embodiment. Assuming that the occupant enters a link number code assigned to the roadside station E as a destination, the entered code is stored in the transmission buffer 220 of the on-board unit M03 in the form of the destination code 62 of the dynamic code 60.

The controller 210 transmits the destination code 62 to a roadside station 10 which the mobile station M03 reaches for the first time after the entry of the code 62. Specifically, as the mobile station M03 enters the service area 20 of a roadside station A for the first time, the controller 210 of the on-board unit M03 sends the dynamic code 62 including the destination code 62 to the roadside station A by using the vehicle ID field 104 of the frame 100. On receiving the dynamic code 60 from the mobile station M03, the roadside station A once stores it in the memory 42 and then transmits it to the on-road vehicle telecommunications network 22 together with the other codes of the mobile station M03. These codes are switched by the telecommunications network 22, so that a code representative of a guidance request is transmitted to the system center 26.

The system center 26 received the destination of the mobile station M03 selects an optimum route to the roadside station or destination E by taking account of the current traffic conditions also. Further, the system center 26 estimates the further movement of the mobile station M03 and thereby determines a roadside station B which can send a guidance code to the mobile station M03. Then, the system center 26 sends to the telecommunication network 22 a guidance code associated with a roadside station C which immediately follows the roadside station B to a roadside station or destination E. On receiving the guidance code meant for the mobile station M03, the roadside station B stores it in the memory 42 and monitors its own zone 20 in which the mobile station M03 is expected to enter.

Figure 11:
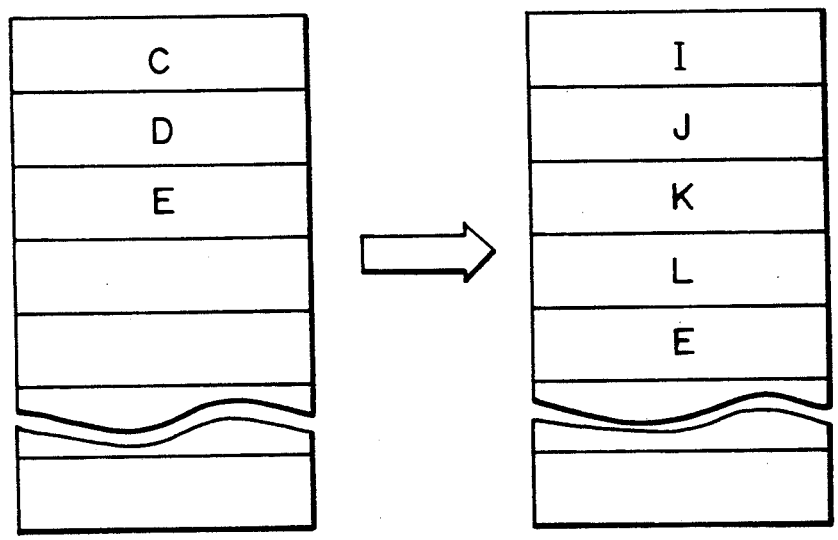
FIG. 11 indicates a guidance list data stored in which are changed in response a change of the route as shown in FIG. 10.

When the roadside station B finds the mobile station M03 in its zone 20, it sends the guidance code destined to the station M03 by using the vehicle communication field 108 of the frame 100. As the mobile station M03 receives the guidance code, the controller 210 of the substation M03 stores it in the memory 212 in the form of a guidance list as shown on the left-hand side of FIG. 11. At the same time, the mobile station M03 receives from the roadside station B information which shows the surroundings of the station B, e.g., a message "Crossroads X is located 300 meters ahead. A left turn at the crossroads X will being you to a roadside station C, and a right turn to a roadside station K".

By comparing the roadside station data with the guidance list, the controller 210 of the on-board unit M03 shows the vehicle occupant a direction for driving the vehicle 12. In this instance, since the roadside station C is recorded in the guidance list, the on-board unit M03 instructs the occupant to make a left turn at the crossroads X which is situated 300 meters ahead. For this instruction, the vocoder 280 may produce an audible message such as "Turn to the left at crossroads X which is located 300 meters ahead" or, alternatively, the display 256 may provide a simple visible direction command thereon.

As the mobile station M03 turns to the left at the crossroads X to enter the zone 20 of the roadside station C, the roadside station C sends static information including its own position information and roadside station information to the mobile station M03 by using the introductory field 102 of the frame 100. In response, the controller 210 of the on-board unit M03 compares the position data of the roadside station C with the guidance list to see that the vehicle 12 is following the right way. Again, the on-board unit M03 shows the occupant the next path to follow in response to the roadside station information which is also fed from the roadside station C.

Assume that a traffic accident has occurred on the path between the roadside stations D and E after the transmission of the guidance code from the system center 26 to the mobile station 16, as shown in FIG. 10. Then, accident information is fed from an external data center or from the telecommunications network 22 to the system center 26. On receiving the accident information, the system center 26 searches for the mobile station M03 which is expected to move along the path between the roadside stations D and E, on the basis of the guidance code. After confirming that the system center 26 has sent a guidance code on the path between the roadside stations C and E to the mobile station M03, the system center 26 determines the current position of the mobile station M03 by way of the registry station 32.

As the system center 26 sees that the mobile station M03 is running in the neighborhood of the roadside station C through the registry station 32, it estimates the future movement of the mobile station M03 and prepares a guidance code indicative of the path extending from a roadside station I, which follows a roadside station F capable of transmitting the guidance code, to the roadside station or destination E. The guidance code is sent to the telecommunications network 22 while being stored in the system center 26 to prepare for a future change. On receiving the guidance code from the roadside station F, the controller 210 of the mobile station M03 changes the guidance list, as shown on the right-hand side of FIG. 11. Then, the mobile station M03 leads the occupant to the roadside station E according to the guidance list.

As described above, in the illustrative embodiment, the system is capable of immediately dealing with a sudden change in the traffic conditions ascribable to an accident, for example, and therefore guiding a subscriber vehicle 12 to a destination along an optimum route which matches the instantaneous traffic conditions. Since the occupant of the vehicle 12 is informed of a direction for driving the vehicle 12 by the on-board unit 16, the occupant needs only to steer the vehicle 12 as instructed by the on-board unit 16 and does not have to find out a route on a map. Another advantage attainable with this particular embodiment is that the traffic conditions can be grasped and controlled collectively, enhancing the scattered flows of traffic.

An alternative guidance scheme which may be implemented by the mobile telecommunications system of the present invention will be described. In the illustrative embodiment, in response to a guidance request from a mobile station 16, the system center 26 selects an optimum route and then sends a guidance code including command data to the mobile station 16. Specifically, the guidance code of this embodiment includes the station codes of roadside stations 10 which a mobile station 16 is expected to pass before reaching a destination and a command for guiding the mobile station 16 along those roadside stations 10. Assuming that a mobile station 16 will reach a certain roadside station 10 when it turns to the left at crossroads X by way of example, the command data may be provided in the form of a message "Turn left at crossroads X". The guidance code is stored in the memory 212 (FIG. 5) of the mobile station 16. The system center 26 is accommodated in the central station 34 by the trunk 40, although it may of course be connected to the regional station 32 or the district station 30 as the case may be.

In the illustrative embodiment, the controller 210 of the mobile station 16 having stored the guidance list locates its own station on the basis of the static data sent from the roadside station 10. Then, the controller 210 notifies the occupant of the instructed direction via the display 256 and/or the vocoder 280 according to the command being stored in the guidance list. This, as in the previous embodiment, allows the occupant to know the route to follow beforehand and thereby eliminates the need for a map with a particular route otherwise indicated on the display 256. Of course, latest map information is available from the system center 26 whenever the occupant desires. The received map information may be shown on the display 256 or outputted by the facsimile transceiver 254.

Figures 12, 13:
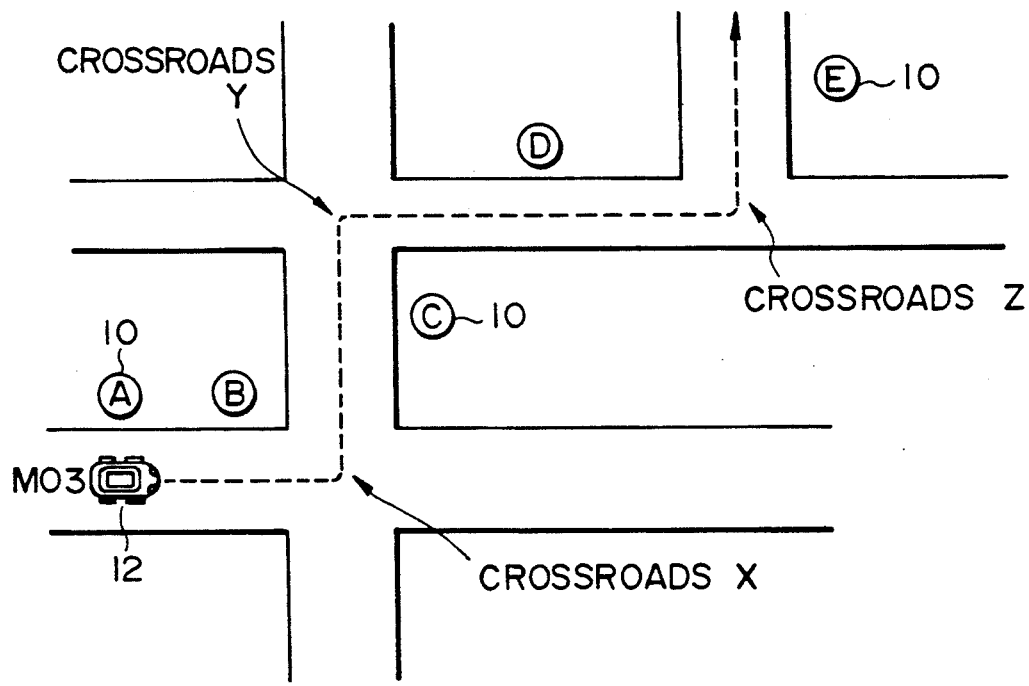
FIG. 12 is a sketch showing a specific route which a subscriber vehicle may follow in accordance with an alternative embodiment of the present invention.
FIG. 13 shows a specific guidance list including route commands which are associated with the route illustrated in FIG. 12.

FIG. 12 exemplarily shows a route which a subscriber vehicle 12 sent a guidance request to the system center 26 may follow, for facilitating an understanding of the above-stated alternative embodiment. Assume that the subscriber vehicle 12 shown in FIG. 12 is loaded with a mobile station or on-board unit to which a mobile station code M03 is assigned. To send a guidance request to the system center 26, the occupant of the vehicle 12 manipulates the key input unit 252 to enter a destination which may be a link number code assigned to a particular roadside station 10 by way of example. Assuming that the occupant enters a link number code assigned to a roadside station E as a destination, the entered code is stored in the transmission buffer 220 of the on-board unit M03 in the form of the destination code 62 of the dynamic code 60.

The controller 210 transmits the destination code 62 to a roadside station 10 which the mobile station M03 reaches for the first time after the entry of the code 62. Specifically, as the mobile station M03 enters the service area 20 of a roadside station A for the first time, the controller 210 of the on-board unit M03 sends the dynamic code 62 including the destination code 62 to the roadside station A by using the vehicle ID field 104 of the frame 100. On receiving the dynamic code 60 from the mobile station M03, the roadside station A once stores it in the memory 42 and then transmits it to the telecommunications network 22 together with the other codes of the mobile station M03. These codes are switched by the telecommunications network 22, so that a code representative of a guidance request is transmitted to the system center 26.

The system center 26 received the destination code of the mobile station M03 selects an optimum route to the roadside station or destination E by taking account of the current traffic conditions also. Further, the system center 26 estimates the further movement of the mobile station M03 and thereby determines a roadside station B which can send a guidance code to the mobile station M03. In the case that the route indicated by a dotted line in FIG. 12 is the instructed optimum route, the system center 26 sends to the telecommunications network 22 a guidance code associated with a roadside station C which immediately follows the roadside station B to the roadside station or destination E. On receiving the guidance code meant for the mobile station M03, the roadside station B stores it in the memory 42 and monitors its own zone 20 in which the mobile station M03 is expected to enter.

When the roadside station B finds the mobile station M03 in its zone 20, it sends the guidance code destined to the station M03 by using the vehicle communication field 108 of the frame 100. As the mobile station M03 receives the guidance code, the controller 210 of the station M03 stores it in the memory 212 in the form of a guidance list as shown in FIG. 13. At the same time, the mobile station M03 receives from the roadside station B information which shows the surroundings of the station B, e.g., a message "Crossroads X is located 300 meters ahead".

By comparing the roadside station information with the guidance list, the controller 210 of the on-board unit M03 shows the vehicle occupant a direction for driving the vehicle 12. In this case, the on-board unit M03 instructs the occupant to make a left turn at the crossroads X which is situated 300 meters ahead, based on the command data being stored in the guidance list. For this instruction, the vocoder 280 may produce an audible message such as "Turn to the left at crossroads X which is located 300 meters ahead" or, alternatively, the display 256 may provide a simple visible direction command thereon.

As the mobile station M03 makes a left turn at the crossroads X to enter the zone 20 of the roadside station C, the roadside station C sends static data including its own position information and roadside station information to the mobile station M03 by using the introductory field 102. The controller 210 of the mobile station M03 compares the position data representative of the roadside station C with the guidance list and thereby sees that the way the mobile station M03 is following is right. Further, when the roadside station C sends roadside station information such as "Crossroads Y is located 200 meters ahead" to the mobile station M03, the mobile station M03 instructs the occupant to turn left at crossroads Y located 200 meters ahead, according to the command being stored in the guidance list. In this manner, the mobile station M03 is successfully guided to reach the destination or roadside station E by way of the roadside station D.

As stated above, in this particular embodiment, a subscriber vehicle 12 is allowed to arrive at a destination via an optimum route which best matches the instantaneous traffic conditions. Since the direction to travel is instructed by the on-board unit 16, the vehicle occupant needs only to steer the vehicle 12 as instructed and does not have to select a particular route by observing a map. In addition, the illustrative embodiment promotes the scattered flows of traffic because it is capable of grasping and controlling the traffic collectively. Furthermore, since the route which the on-board unit 16 commands is prepared by the system center 26 in matching relation to the current traffic conditions, the traffic as a whole can be prevented from centering around particular roads.

This embodiment may also be modified such that, when a mobile station 16 determines that it has been brought out of an expected route to the destination, it retransmits a guidance request to the system center 26, or such that a guidance code sent from the system center 26 is transmitted to a mobile station 16 in association with a change in the traffic conditions.

While the destination to be entered in the destination code 62 has been shown and described as comprising a roadside station 10 throughout the various embodiments, it may of course of replaced with any other kind of target such as the name of a specific place. If desired, a subscriber vehicle 12 may be provided with an automatic steering function to be steered automatically as instructed by a command from its on-board unit 16.

It is to be noted that the embodiments shown and described are applicable not only to an on-road vehicle telecommunications system but also to a system which implements communications between a system center and individuals, i.e. pedestrians in a broad sense.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile telecommunications system for communicating with at least one mobile station, the system comprising:
    a plurality of base stations, each corresponding to and establishing a respective miniature zone, each base station being equipped to communicate via an electromagnetic link with the mobile station carried on a vehicle while the vehicle is located in or travelling through the corresponding miniature zone;

a system center for selecting an optimum route along which the vehicle will reach a destination to which the vehicle is directed in the substantially shortest period of time under traffic conditions presently available to said system center; and a telecommunications network configured for bi-directional communications between said system center and said plurality of base stations;

each of said base stations having a respective first identification allotted specifically thereto and being equipped to transmit base station data including its respective first identification to mobile stations located in or travelling through the miniature zone corresponding to the base station;

said system center producing optimum route data for subsequent transmission to one or more of said plurality of base stations which the vehicle will pass as it travels along the route to said destination, said optimum route data representative of the optimum route in the form of the first identifications which correspond to said one or more of said plurality of base stations;

said mobile station being equipped, while the vehicle carrying said mobile station is located in or travelling through any of said miniature zones, to transmit mobile station data and a guidance request signal asking for said optimum route data, to receive said optimum route data, to receive said base station data from the base station corresponding to the miniature zone in which the mobile station is located or through which it is passing, to compare said optimum route data with said base station data that it has received, to transmit the guidance request signal if the comparison indicates that the vehicle has left a selected optimum route, and to output or indicate selected optimum route data so as to enable the vehicle to be guided along the selected optimum route to the destination, each said base station being responsive to the receipt of the guidance request signal to retransmit the guidance request signal to said telecommunications network;

said telecommunications network being responsive to receipt of the guidance request signal to report the guidance request signal together with said mobile station data to said system center;

said system center selecting, in response to receipt of the guidance request signal, the optimum route for the vehicle based on the traffic conditions and the transmitted mobile station data, and transmitting or communicating said optimum route data representative of said selected optimum route to said telecommunications network for further transmission to said mobile station over said electromagnetic link, while the vehicle carrying said mobile station is located in or travelling through any said miniature zone, said system center also updating said optimum route data for the vehicle based on traffic conditions and transmitting the updated optimum route data to said telecommunications network for further transmission to said mobile station over said electromagnetic link while the vehicle carrying said mobile station is located in or travelling through any said miniature zone.

2. A system in accordance with claim 1, wherein after receiving the guidance request signal, said system center transmits or communicates the optimum route data representative of said optimum route to said telecommunications network for further transmission to said mobile station over the electromagnetic link, while the vehicle carrying said mobile station is in one of the miniature zones, and stores the optimum route data transmitted to the mobile station for updating at a later time, said system center being able to update traffic data based on traffic conditions received from said telecommunications network, and said system center being able to determine when the optimum route data for the mobile station should be updated due to a change in the traffic conditions, and then selecting a new optimum route for the mobile station on the basis of the updated traffic data and then to transmit new updated optimum route data to said telecommunications network for further transmission to the mobile station over said electromagnetic link, while the vehicle carrying said mobile station is in a miniature zone established by a base station along the route to the destination.

3. A system in accordance with claim 1, wherein said system center produces route command data, in the form of a message directing the vehicle along the selected optimum route, said system center transmitting, in response to the guidance request signal, the optimum route data, which includes the route command data, to said telecommunications network for further transmission to said mobile station over said electromagnetic link, while the vehicle carrying said mobile station is located in or passing through one of the miniature zones.

4. A system in accordance with claim 1, wherein said electromagnetic link comprises a radio link, and wherein each of said plurality of base stations is equipped to transmit communications and receive communications over said radio link to and from said mobile station, while the vehicle carrying said mobile station is located in or travelling through the corresponding miniature zone established by said base station, said plurality of base stations using a single frequency of an electromagnetic wave between geographically adjoining ones of said plurality of base stations, said plurality of base stations transmitting and receiving communications using the single frequency;

geographically adjoining ones of said plurality of base stations being spaced apart from each other with an area intervening between them in which area said mobile station is substantially not responsive to the electromagnetic wave on said radio link;

the single frequency of the electromagnetic wave being available to the mobile station in each of said miniature zones, each of said miniature zones being of such a size that only a portion of the base station data and optimum route data is transmitted from a corresponding one of said plurality of base stations to said mobile station while said mobile station is located in or travelling through the miniature zone established by said one base station, and another portion of the base station data and optimum route data is transmitted while said mobile station is in another miniature zone established by another one of said base stations along the route to the destination;

whereby said adjoining base stations are allowed to share the single frequency of the electromagnetic wave to transmit the base station data and the optimum route data to said mobile station intermittently while said mobile station moves across said miniature zones.

5. A system in accordance with claim 3, wherein the mobile station outputs, upon receiving the optimum route data and upon receiving the base station data from one of said plurality of base stations which is associated with the optimum route data, a portion of the message of said route command data.

6. A mobile station to be carried on a vehicle for use in a mobile telecommunications sytem, said system having a plurality of base stations each corresponding to a respective miniature zone, each base station being equipped to transmit communications and receive communications via an electromagnetic wave to and from said mobile station while the vehicle carrying said mobile station is located in or travelling through the corresponding miniature zone, a telecommunications network interconnecting said plurality of base stations for bi-directional communications therewith, a system center interconnected to said telecommunications network for bi-directional communications therewith, said system center selecting, in response to a guidance request signal asking for route guidance data, an optimum route along which said vehicle should take to reach a destination to which the vehicle is directed in the substantially shortest period of time under traffic conditions presently available to said system center, and said system center transmitting or communicating to said telecommunications network optimum route data representative of said optimum route for further transmission to said mobile station, while the vehicle carrying said mobile station is located in or travelling through any of said miniature zones, each one of said plurality of base stations having a respective identification and being equipped to transmit base station data representative of the identification, said mobile station comprising:

receiving means interconnected to a controller for receiving the base station data and the optimum route data and for comparing the optimum route data with the base station data, and for transmitting a new guidance request signal if the comparison indicates that the vehicle has left a selected optimum route, while the vehicle carrying said mobile station is located in or travelling through one of the miniature zones;

outputting means interconnected to said receiving means for outputting a message representative of the optimum route data and the base station data so as to enable the vehicle to be guided along the selected optimum route to the destination;

inputting means for producing the guidance request signal; and transmitting means interconnected to said inputting means for transmitting mobile station data for notifying the system center of the location and destination of the vehicle and the guidance request signal on said electromagnetic link, while the vehicle carrying said mobile station is located in or travelling through one of the miniature zones;

wherein each one of said plurality of base stations is responsive to receipt of said guidance request signal thereby to transmit it to said telecommunications network, said telecommunications network reports said guidance request to said system center, said system center selects the optimum route and updates the optimum route for the vehicle based on traffic conditions, and transmits the optimum route data and the updated optimum route data to said telecommunications network for further transmission to said mobile station over said electromagnetic link, while the vehicle carrying said mobile station is located in or travelling through one of the miniature zones located along the route to the destination.

7. A mobile station in accordance with claim 6, wherein said system center produces route command data, in the form of a message, directing the vehicle along the selected optimum route, said system center transmitting, in response to the guidance request, the optimum route data, which includes the route command data, and, in response to the notification of location and destination of the vehicle, new optimum route data corresponding to said updated optimum route data to said telecommunications network for further transmission to said mobile station over said electromagnetic link, while the vehicle carrying said mobile station is located in or travelling through one of the miniature zones, said receiving means receiving the base station data and the optimum route data, and said outputting means being operative, in response to said base station data and said optimum route data, to output the message representative of said base station data together with said optimum route data.

8. A mobile station in accordance with claim 6, wherein said electromagnetic wave comprises a radio wave forming a radio link, said transmitting means uses a single frequency of the electromagnetic wave of said radio link to transmit and receive between geographically adjoining ones of said plurality of base stations, said plurality of base stations transmitting and receiving communications with which the single frequency is modulated, geographically adjoining ones of said plurality of base stations being spaced apart from each other with an area intervening between them in which said mobile station is substantially not responsive to the electromagnetic wave on said radio link, each of said plurality of base stations establishing the miniature zone in which the single frequency of the electromagnetic wave is available to said mobile station, each of said miniature zones being of such a size that only a portion of the base station data and the optimum route data is transmitted to said mobile station while said mobile station passes through a corresponding one of said miniature zones;

said receiving means being responsive to the single frequency of the electromagnetic wave; and said transmitting means modulating the single frequency with data representative of the guidance request signal;

whereby said adjoining base stations are allowed to share the single frequency of the electromagnetic wave to transmit the base station data and the optimum route data to said mobile station intermittently while said mobile station moves across said miniature zones.

9. A mobile station in accordance with claim 7, wherein, in response to said receiving means receiving the optimum route data, the new updated optimum route data, and the base station data, said outputting means outputs only a portion of the message of said route command data which portion is associated with the one base station which has established the miniature zone through which the vehicle carrying the mobile station is passing.

10. A mobile station in accordance with claim 6, wherein said outputting means visually outputs the optimum route data and the updated optimum route data received from said plurality of base stations.

11. A mobile station in accordance with claim 6, wherein said outputting means produces an audible signal representative of the optimum route data and the updated optimum route data received from said plurality of base stations.

12. A mobile station in accordance with claim 6, wherein said outputting means comprises a vocoder.

13. A mobile station in accordance with claim 6, wherein said outputting means comprises a video display.

14. A mobile station in accordance with claim 6, wherein said outputting means comprises a facsimile receiver set.

15. A mobile station in accordance with claim 6 wherein said outputting means comprises a vocoder, a video display, and a facsimile receiver set.

16. A mobile station in accordance with claim 6, wherein said inputting means comprises a key input unit.

17. A mobile station in accordance with claim 6, wherein said inputting means comprises a speech recognizer unit.

18. A mobile station in accordance with claim 6, wherein said inputting means comprises a facsimile transmitter set.

19. A mobile station in accordance with claim 6, wherein said inputting means comprises a key input unit, a speech recognizer unit, and a facsimile transmitter set.

20. A method for communicating with at least one mobile station, said method comprising the steps of:
transmitting mobile station data and a guidance request signal asking for optimum route data from said mobile station to a plurality of base stations, each base station corresponding to a miniature zone, each base station equipped to transmit communications and receive communications on an electromagnetic wave link to and from the mobile station carried on a vehicle while the vehicle is located in or travelling through said corresponding miniature zone, each of said base stations having a respective first identification allotted specifically thereto, each base station being equipped to transmit base station data representative of the first identification;
transmitting, by said plurality of base stations, said guidance request signal to a telecommunications network;
transmitting, by said telecommunications network, said guidance request signal together with a second identification to a system center;
producing, by said system center, optimum route data representative of an optimum route in the form of the first identification of one or more of said plurality of base stations which the vehicle will pass along the route to a destination to which the vehicle is directed in the substantially shortest period of time under traffic conditions presently available to said system center, and selecting, in response to the guidance request signal, the optimum route for the vehicle based on the traffic conditions and the transmitted mobile station data, and transmitting the optimum route data representative of said selected optimum route to said telecommunications network for further transmission to said mobile station over said link, while the vehicle carrying said mobile station is located within or travelling through one of the miniature zones; and
updating, by said system center, said optimum route data for the vehicle based on traffic conditions and transmitting the updated optimum route data to said telecommunications network for further transmission to said mobile station over said link while the vehicle carrying said mobile station is located within or travelling through any of said miniature zones,
wherein said mobile station receives said optimum route data, receives said base station data from the base station corresponding to the miniature zone in which the mobile station is located or through which it is passing, compares said optimum route data with said base station data that it has received, transmits the guidance request signal if the comparison indicates that the vehicle has left said selected optimum route, and outputs or indicates the selected optimum route data so as to enable the vehicle to be guided along the selected optimum route to the destination.

21. A method in accordance with claim 20 further comprising the steps of said system center:
storing the optimum route data transmitted to the mobile station for updating at a later time;
updating traffic data based on traffic conditions received from said telecommunications network;
determining when the optimum route data for the mobile station should be updated due to a change in the traffic conditions, and then selecting a new optimum route for the mobile station on the basis of the updated traffic data; and
transmitting new updated optimum route data to said telecommunications network for further transmission to the mobile station over said link, while the vehicle carrying said mobile station is located in or passing through a miniature zone established by a base station along the route to the destination.

22. A method in accordance with claim 20 further comprising the steps of said system center:
producing route command data in the form of a message directing the vehicle along the selected optimum route; and
transmitting, in response to the guidance request signal, the optimum route data, which includes the route command data, to said telecommunications network for further transmission to said mobile station over said link, while the vehicle carrying said mobile station is located in or passing through one of the miniature zones.

23. A method in accordance with claim 22 further comprising the step of the mobile station:
outputting, upon receiving the optimum route data and upon receiving the base station data from one of said plurality of base stations which is associated with the optimum route data, a portion of the message of said route command data which is associated with said one base station.

24. A method for communicating with a mobile station to be carried on a vehicle for use in a mobile telecommunications system, said method comprising the steps of said mobile station:
  producing a guidance request signal asking for route guidance data;
  transmitting mobile station data for notifying one of a plurality of base stations of the location and destination of the vehicle and said guidance request signal on an electromagnetic wave link, while the vehicle carrying said mobile station is in a miniature zone established by said one base station, said one base station receiving said guidance request signal and transmitting said guidance request signal to said telecommunications network, said telecommunications network reporting said guidance request to said system center, said system center selecting an optimum route along which said vehicle should take to reach the destination to which the vehicle is directed in the substantially shortest period of time under traffic conditions presently available to said system center and updating the optimum route for the vehicle based on traffic conditions and transmitting the optimum route data and the updated optimum route data to said telecommunications network for further transmission to said mobile station over said link, the vehicle carrying said mobile station receiving said optimum route data or updated route data while the mobile station is located in or passing through any of the miniature zones established by said base stations along the route to the destination;
  receiving base station data and the optimum route data from said one of said plurality of base stations;
  comparing said optimum route data with said base station data;
  transmitting a new guidance request signal if the comparison indicates that the vehicle has left the selected optimum route, while the vehicle carrying said mobile station is in any one of the miniature zones; and
  outputting a message representative of said optimum route data and said base station data so as to enable the vehicle to be guided along the selected optimum route to the destination.

25. A method in accordance with claim 24 wherein said system center produces route command data, in the form of a message, directing the vehicle along the selected optimum route, and transmits, in response to the guidance request signal, the optimum route data, which includes the route command data, and, in response to the notification of the location and the destination of the vehicle, new optimum route data corresponding to the updated optimum route data to said telecommunications network for further transmission to said mobile station over said link, while the vehicle carrying said mobile station is located in or passing through any of the miniature zones.

26. A method in accordance with claim 24 further comprising the step of outputting, in response to receiving the optimum route data, new updated optimum route data corresponding to the updated optimum route data and base station data while the vehicle carrying said mobile station is located in or passing through any said miniature zone from a corresponding one of the plurality of base stations which is associated with the optimum route data, a portion of the message of said route command data which is associated with said one base station.

27. A method in accordance with claim 24 further comprising the step of visually outputting or indicating the optimum route data and the new updated optimum route data received from said plurality of base stations.

28. A method in accordance with claim 24 further comprising the step of producing an audible signal representative of the optimum route data and the new updated optimum route data received from said plurality of base stations.

* * * * *